(12) United States Patent
Lenglet (10) Patent No.: US 8,076,932 B2
(45) Date of Patent: *Dec. 13, 2011

(54) DEVICE AND METHOD FOR MEASURING THE POSITION OF A MOBILE PART

(75) Inventor: Luc Lucien Marie Lenglet, Levallois-Perret (FR)

(73) Assignee: Neelogy, Cachan (FR)

( * ) Notice: Subject to any disclaimer, the term of this patent is extended or adjusted under 35 U.S.C. 154(b) by 254 days.

This patent is subject to a terminal disclaimer.

(21) Appl. No.: 12/516,641

(22) PCT Filed: Nov. 28, 2007

(86) PCT No.: PCT/FR2007/001949
§ 371 (c)(1),
(2), (4) Date: Jun. 23, 2009

(87) PCT Pub. No.: WO2008/081092
PCT Pub. Date: Jul. 10, 2008

(65) Prior Publication Data
US 2010/0072986 A1    Mar. 25, 2010

(30) Foreign Application Priority Data

Nov. 29, 2006  (FR) ..................... 06 10436

(51) Int. Cl.
*G01R 33/04* (2006.01)
*G01R 19/20* (2006.01)
(52) U.S. Cl. ..................... 324/253; 324/117 R; 335/297
(58) Field of Classification Search ............. 324/207.13, 324/207.15, 207.16, 207.24, 207.25, 253
See application file for complete search history.

(56) References Cited

U.S. PATENT DOCUMENTS

| 5,580,216 | A | 12/1996 | Munsch |
| 6,275,031 | B1* | 8/2001 | Simmonds ..................... 324/239 |
| 7,355,822 | B2* | 4/2008 | Daughton et al. ............. 360/324 |
| 2004/0032253 | A1* | 2/2004 | Suzuki et al. ............. 324/207.24 |
| 2007/0001668 | A1* | 1/2007 | Mock et al. ............. 324/207.22 |
| 2008/0134727 | A1* | 6/2008 | May ............................. 68/12.02 |

FOREIGN PATENT DOCUMENTS

| EP | 0664400 | 7/1995 |
| FR | 2230966 | 12/1974 |
| FR | 2873807 | 2/2006 |
| WO | 2005088257 | 9/2005 |

OTHER PUBLICATIONS

International Search Report dated Jul. 21, 2008, in PCT application.

* cited by examiner

*Primary Examiner* — Huy Q Phan
*Assistant Examiner* — Alesa Allgood
(74) *Attorney, Agent, or Firm* — Young & Thompson (57) ABSTRACT

A device for measuring the position of a mobile part (4), includes: at least one magnetic node (10) capable of modulating the amplitude of an excitation magnetic field according to the amplitude of a magnetic field to be measured, the magnetic node having a magnetic cycle for magnetic induction that depends on the hysteresis-free magnetic field in an operation range [$H_{min}$; $H_{max}$], and in which the magnetic cycle of the magnetic node (10) is characterised in that the absolute value of the third derivative of the magnetic induction relative to the magnetic field is maximal for a zero magnetic field.

14 Claims, 5 Drawing Sheets

DEVICE AND METHOD FOR MEASURING THE POSITION OF A MOBILE PART

The present invention relates to a device and to a method for measuring the position of a moving part.

There exist devices for measuring the position of a first moving part which comprise:
- at least a first generator for generating a first magnetic field to be measured, this first generator being fastened to the first moving part;
- at least one magnetic core capable of modulating the amplitude of an excitation magnetic field as a function of the amplitude of the first magnetic field to be measured, this magnetic core having a magnetic induction cycle as a function of the magnetic field with no hysteresis within an operating range [$H_{min}$; $H_{max}$]; and
- an electronic computer capable of determining the position of the first moving part relative to the magnetic core from the amplitude of a magnetic field induced in the magnetic core, this induced magnetic field resulting from the combination of the magnetic field to be measured and the excitation magnetic field.

These devices are particularly useful for measuring the position of a part that is rotating or moving translationally.

To modulate the amplitude of the excitation magnetic field, the core must be highly nonlinear and therefore must have a relative permeability that varies with the magnetic field. For this purpose, the materials conventionally used for producing these cores are soft magnetic alloys.

To control the hysteresis problems, isotropic alloys (for example Mu-Metal®) or anisotropic alloys of the oriented nanocrystalline strip type are used. Irrespective of the material, an excitation field that will more or less saturate the material is used. Specifically, the saturation of the magnetic material creates a significant point of inflection in the B(H) magnetic cycle of these materials. This point of inflection is the nonlinearity used to modulate the magnetic field. More precisely, the presence of an external field to be measured will increase the saturation and thus generate harmonics that will be detected. It may also be said that the field to be measured is used to modulate the excitation field.

When the material is saturated, the relative permeability suddenly drops and the core then loses its flux-concentrating capability, thereby lowering the sensitivity of the measurement device.

The aim of the invention is to remedy this drawback by proposing a device for measuring the position of a part in which it is not necessary to saturate the magnetic core.

Therefore one subject of the invention is a measurement device in which the magnetic cycle of the magnetic core is characterized in that the absolute value of the third derivative of the magnetic induction with respect to the magnetic field is a maximum for a zero magnetic field.

It has been discovered that magnetic cores having the above magnetic cycle property exhibit a nonlinearity around the zero magnetic field which is large enough to allow the amplitude of the excitation magnetic field to be modulated by the amplitude of the magnetic field to be measured without it being necessary for this to saturate the magnetic core.

The embodiments of this device may comprise one or more of the following features:
- an electronic circuit capable of generating the excitation magnetic field and/or a feedback magnetic field suitable for permanently keeping the amplitude of the induced magnetic field within the operating range [$H_{min}$; $H_{max}$] located around zero, the magnetic core never being saturated within the operating range;
- the magnetic core is a superparamagnetic core;
- the superparamagnetic core is formed from a solid matrix in which superparamagnetic particles are dispersed so as to be spaced apart from one another sufficiently for the core to be superparamagnetic;
- the superparamagnetic particles represent at least 5% of the volume of the matrix into which they are incorporated;
- the device comprises a second generator, for generating a second magnetic field to be measured, this second generator being fastened to a second moving part, the second magnetic field having a power spectrum having at least one power peak at a different frequency from the frequencies for which the power spectrum of the first magnetic field has power peaks; the same magnetic core is also capable of simultaneously modulating the amplitude of the excitation magnetic field as a function of the amplitude of the first and second magnetic fields to be measured; and the electronic circuit is capable of:
  - determining the position of the first moving part relative to the core from the amplitude of the magnetic field induced in the magnetic core and from the first field generated during the measurement interval and
  - determining the position of the second moving part relative to the core from the amplitude of the same magnetic field induced in the magnetic core and from the second field generated during the same measurement interval, the magnetic field induced in the magnetic core resulting from the combination of the first and second magnetic fields to be measured and the excitation magnetic field;
- at least one of the power spectra of the excitation magnetic field or of the power spectrum of the magnetic field to be measured has a dominant power peak for a frequency $F_0$ and in which an electronic circuit capable of measuring an amplitude of the magnetic field to be measured comprises:
  - at least one transducer suitable for converting the magnetic field induced inside the core to a measurement signal; and
  - an amplitude demodulator suitable for extracting the amplitude of a harmonic of the measurement signal at a frequency $NF_0$, N being an integer greater than or equal to two;
- N is equal to two; and
- the first generator, fastened to the moving part, generates a DC magnetic field having a positive polarity and a negative polarity and the device includes a third generator, for generating a DC magnetic field to be measured, this third generator being fastened to the same moving part and having a positive polarity and a negative polarity, either the positive polarity or the negative polarity of the third generator being placed opposite the polarity of the same sign of the first generator.

These embodiments of the magnetic field sensor also have the following advantages:
- the fact of preventing saturation to the magnetic core ensures that the core always fulfils the flux-concentrating function and enables the transducer to operate in its linear response zone;
- the magnetic properties of a superparamagnetic core are highly nonlinear, although not exhibiting hysteresis, even when the magnetic field is very much lower than the saturation field;
- introducing more than 5 vol % of superparamagnetic particles into the matrix improves the magnetic properties of the core, thereby improving the performance of the device;

by simultaneously using two generators, for generating fields to be measured, which are fastened to different parts producing different magnetic fields to be measured, it is possible for the position of these two parts to be measured simultaneously using the same magnetic core;

by measuring the amplitude of a harmonic of frequency $2F_0$ or higher, it is possible to increase the sensitivity of the device while circumventing any interference with the excitation magnetic field;

using the amplitude of the harmonic of frequency $2F_0$ simplifies the construction of the device, since the amplitude of this harmonic is directly proportional to the amplitude of the field to be measured; and the use of a first and a third generator fastened to the moving part, the poles of the same sign of said generators being placed facing one another, linearizes the variations of the amplitude of the magnetic field to be measured as a function of the position of the moving part, which in the end increases the sensitivity of the device.

Another subject of the invention is a method of measuring the position of at least one moving part, this method comprising:

the generation of a first magnetic field to be measured by means of a field generator fastened to the first moving part;

the provision of at least one magnetic core capable of modulating the amplitude of an excitation magnetic field as a function of the amplitude of the first magnetic field to be measured, this magnetic core having a magnetic induction cycle as a function of the magnetic field with no hysteresis within an operating range $[H_{min}; H_{max}]$; and the determination of the position of the first moving part relative to the magnetic core from the amplitude of a magnetic field induced in the magnetic core, this induced magnetic field resulting from the combination of the first magnetic field to be measured and the excitation magnetic field, in which the magnetic cycle of the magnetic core is characterized in that the absolute value of the third derivative of the magnetic induction with respect to the magnetic field is a maximum for a zero magnetic field.

Figure 1:
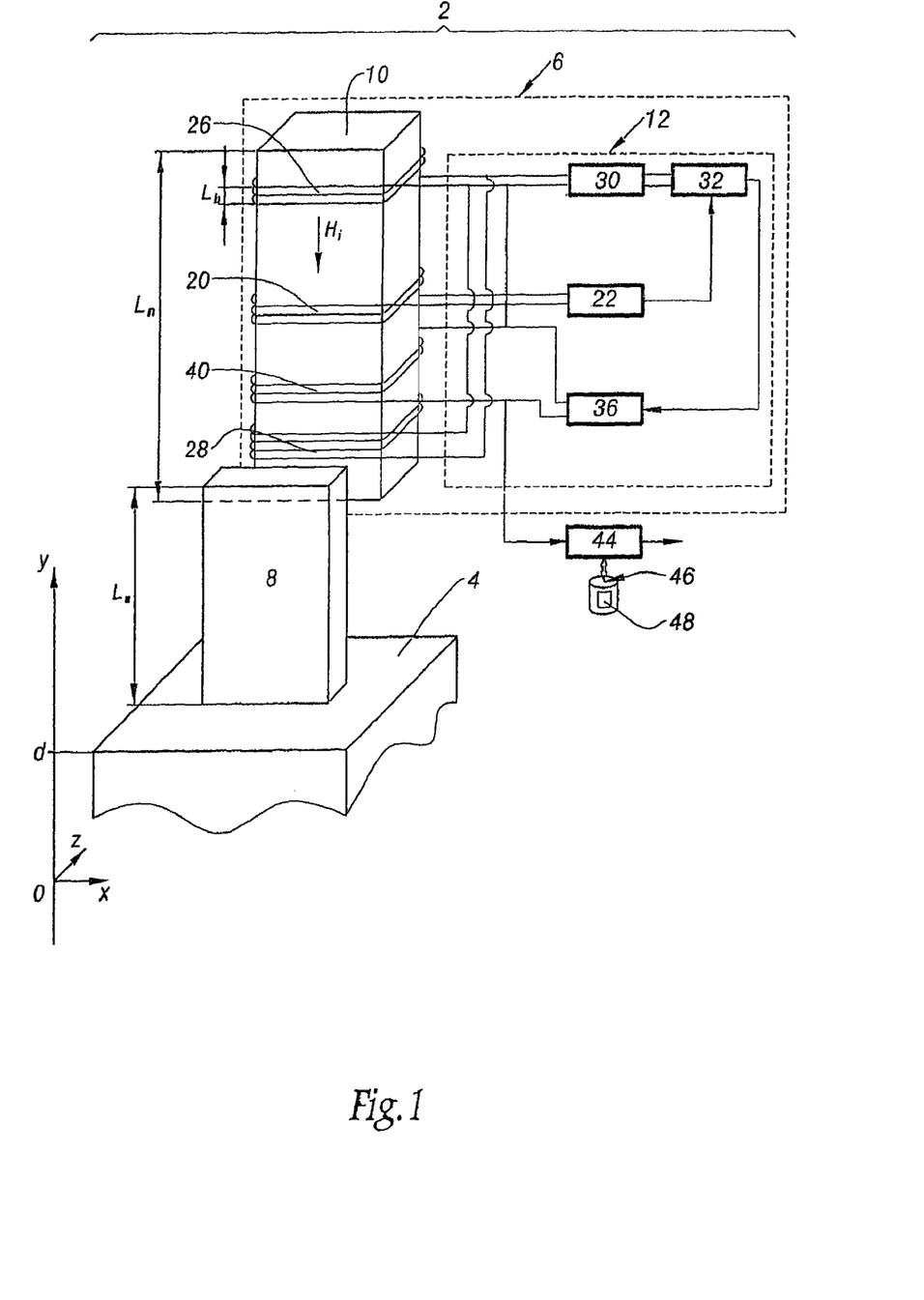
FIG. 1 is a schematic illustration of the architecture of a device for measuring the position of a moving part.

The invention will be better understood on reading the following description, given solely by way of nonlimiting example and with reference to the drawings in which:

FIG. 1 shows a device 2 for measuring the position of a moving part 4.

Here, part 4 can move only translationally along a vertical axis Y between two extreme positions $d_{min}$ and $d_{max}$. The position of the part 4 along the Y axis is indicated by a distance d relative to an origin O.

The device 2 comprises a sensor 6 for detecting a magnetic field $H_m$ to be measured and a generator 8 for generating the magnetic field $H_m$.

The generator 8 is fixed to the part 4 without any degree of freedom.

The generator 8 is placed opposite the sensor 6 so that the magnetic field $H_m$ generated can be measured by the sensor 6 irrespective of the position of the part 4 between $d_{min}$ and $d_{max}$. For example, here the generator 8 is a magnet in which the North pole and the South pole of the magnet are aligned along the Y axis.

The height of the magnet along the Y direction is denoted by $L_a$.

The sensor 6 is equipped with a magnetic core 10 and with an electronic circuit 12 connected to the core 10. Preferably, the core 10 is a superparamagnetic core.

Figure 2:
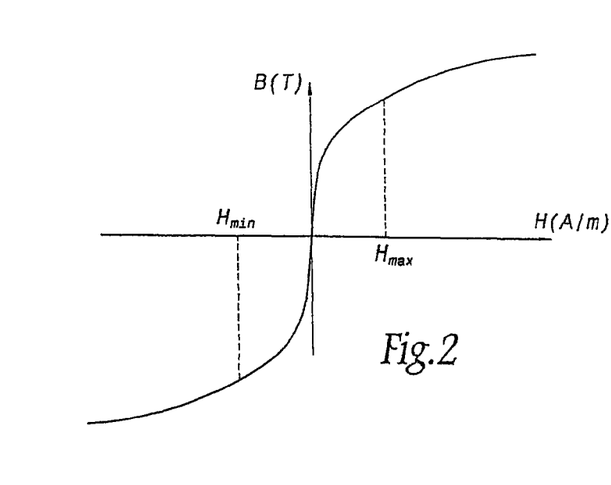
FIG. 2 is a graph showing the variation of the magnetic induction ($\vec{B}$) as a function of the induced magnetic field ($\vec{H}$) in a magnetic core of the device of FIG. 1.

A superparamagnetic core exhibits a B(H) magnetic cycle, a typical example of which is shown in the graph of FIG. 2. In FIG. 2, the magnetic field H in amps per meter is plotted on the x-axis and the magnetic induction B in tesla is plotted on the y-axis.

Figure 3:
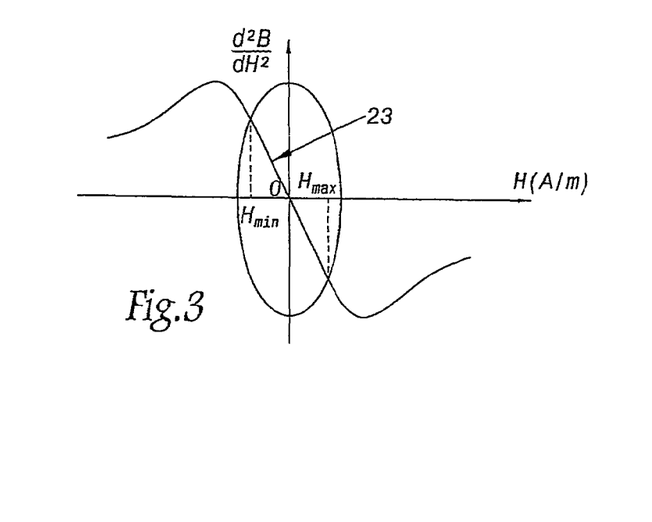
FIG. 3 is a graph showing the variation of the second derivative of the magnetic induction ($\vec{B}$) as a function of the induced magnetic field ($\vec{H}$) in the core of FIG. 1.

FIG. 3 shows the variation of the second derivative of the magnetic induction B as a function of the magnetic field H. This second derivative has a virtually linear and highly inclined slope 23 (bounded by the ellipse). This slope 23 is centered on the zero value of the magnetic field H and lies between the bounds $H_{min}$ and $H_{max}$. Here the bounds $H_{min}$ and $H_{max}$ define the operating range of the sensor 6. Between the bounds $H_{min}$ and $H_{max}$, the relative permittivity $\mu_r$ of the core is strictly greater than 1, so that the core 10 is never saturated between these bounds.

Figure 4:
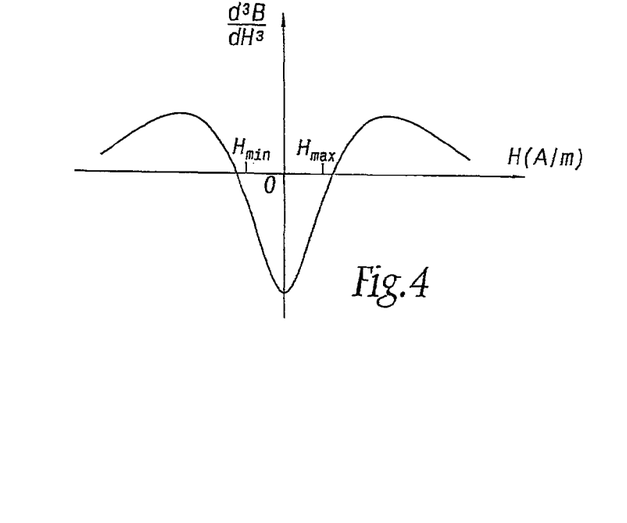
FIG. 4 is a graph showing the variation of the third derivative of the magnetic induction ($\vec{B}$) as a function of the induced magnetic field ($\vec{H}$) in the core of the device of FIG. 1.

FIG. 4 shows the variation of the third derivative of the magnetic induction B as a function of the magnetic field H. The absolute value of this third derivative is a maximum when the magnetic field is zero. This extremum when the magnetic field is zero corresponds to the steep slope 23.

A superparamagnetic material is characterized by the fact that:

1) it has no magnetic remanence, so that the magnetic induction B is zero or virtually zero when the magnetic field H is zero;
2) it exhibits no hysteresis, so that the magnetization curve is coincident with the demagnetization curve in the B(H) magnetic cycle;
3) the relative permeability varies continuously and non-linearly with the magnetic field;
4) the B(H) magnetic cycle has the same form and the same properties irrespective of the direction of the magnetic field H; and
5) the absolute value of the third derivative of the magnetic induction B with respect to the magnetic field H has a maximum when the magnetic field H is zero.

Feature 2) differentiates superparamagnetic materials from soft magnetic alloys, such as mu-metal®.

Feature 4) differentiates superparamagnetic materials from an oriented nanocrystalline strip, since the latter exhibits a B(H) magnetic cycle with no hysteresis and no magnetic remanence only for a single specified direction of the magnetic field H. Consequently, the orientation of the superparamagnetic core relative to the magnetic field to be measured does not matter, whereas this is not so in the case when the core is made from an oriented nanocrystalline strip.

Feature 5) derives from the fact that the B(H) magnetic cycle is highly nonlinear around the zero magnetic field. It also follows that the slope 23 is steeply inclined. Thus, a weak variation of the magnetic field H results in a large variation of the second derivative of the magnetic induction B and also in a large variation of the amplitude of the even harmonics in the measured signal. The even harmonics are defined as those whose frequency is an integer multiple N of the frequency of the excitation of the magnetic field, N being an even number. This explains why the sensor 6 is very sensitive to variations of the magnetic field to be measured around the zero magnetic field.

In addition, the slope 23 is linear or practically linear over the operating range of the sensor 6, so that the conversion of the measured signal to a magnetic field is simplified.

The superparamagnetic material used here to produce the core 10 comprises a solid matrix through the thickness of which superparamagnetic particles are incorporated. These superparamagnetic particles are for example ferromagnetic particles of which the largest dimension is small enough for them to be taken individually, to exhibit a B(H) magnetic cycle having the same properties as that shown in FIG. 3. Typically, the largest dimension of the ferromagnetic particles is chosen to be less than 100 nanometers and most often less than 20 nanometers. This largest dimension of the ferromagnetic particles below which they become superparamagnetic depends on the ferromagnetic material used. Superparamagnetism and superparamagnetic particles are described in the following literature reference: E. du Trémolet de Lacheisserie et al., "Magnetisme [*Magnetism*]", Volume 1, Presses Universitaire de Grenoble, 1999.

Iron oxides are the preferred superparamagnetic particles. For completeness, it should be pointed out that the superparamagnetic particles may be chosen from iron oxides and mixed oxides of iron and another metal, especially one chosen from Mn, Ni, Zn, Bi, Cu and Co. The iron oxides $Fe_3O_4$ and $Fe_2O_3$ are preferably used. It is also possible to use perovskites having superparamagnetic properties, particularly iron-based perovskites, superparamagnetic nickel oxides and cobalt oxides or mixed nickel cobalt oxides, or else superparamagnetic metal alloys, e.g. of the FeNi and CoNi type, particularly $Fe_{20}Ni_{80}$.

The solid matrix is chosen so as not to disturb the magnetic properties of the superparamagnetic particles. For example, the solid matrix is only diamagnetic.

Furthermore, it should be noted that the term "solid" denotes here also matrices made of reversibly elastically deformable materials, such as elastomers.

Various materials that can be used as a solid matrix within the context of the invention may be used. Preferably, the matrix is a plastic, especially one chosen from thermosets (e.g. phenoplasts, aminoplasts, epoxy resins, unsaturated polyesters, crosslinked polyurethanes and alkyds) and thermoplastics (e.g. polyvinyl polymers, such as polyvinyl chlorides, and polyvinyl acetates, polyvinyl alcohols, polystyrenes and copolymers, acrylic polymers, polyolefins, cellulose derivatives and polyamides), or else special polymers (e.g. fluoropolymers, silicones, synthetic rubbers, saturated polyesters, linear polyurethanes, polycarbonates, polyacetales, polyphenylene oxides, polysulfones, polyethersulfones, polyphenylene sulfides, and polyimides). The elastomers may in particular be of the silicone or synthetic rubber type.

The material constituting the matrix may be chosen depending on the final application, and in particular on the usage conditions. Thus, in the automotive industry, matrices resistant to standard operating temperatures, especially temperatures ranging from −30° C. to +150° C., are recommended. In the aeronautical field, the typical temperature range that the matrix must withstand is from −40° C. to +100° C.

At the material preparation stage, the superparamagnetic particles may be incorporated in powder form into the material intended to form the matrix or into a fraction or portion of this material. Said particles may also be supplied already dispersed in a medium, which will be mixed with the material intended to form the matrix or with a fraction or portion of this material. In all cases, the mixing must be sufficient to obtain in the end a suitable dispersion of the particles throughout the matrix.

The material may be produced directly in bulk form or may be obtained from beads, granules or the like of the matrix that includes the superparamagnetic particles, these beads, granules or the like then being agglomerated under pressure, sintered, melted or subjected to any other suitable process.

Thus, the material may be produced by mixing the constituent(s) of the matrix with a suspension of superparamagnetic particles in an organic phase which is miscible with the constituent(s) of the matrix, followed by polymerization. The organic phase containing the superparamagnetic particles may be formed from or comprise an organic solvent, or else may be formed from or comprise one or more constituents of the matrix. To give an example, the material is produced by emulsion polymerization, e.g. the superparamagnetic particles are dispersed in an organic phase containing the constituent(s) of the matrix, then the dispersion obtained is mixed with all or part of an aqueous solution formed from water and at least one emulsifier, and then the mixture is homogenized and finally polymerized. To give an illustration, the emulsion polymerization process described in FR-A-2 480 764 may be employed.

To facilitate manufacture of the core 10, the matrix here is made of a thermoplastic or thermosetting material.

The distribution of the superparamagnetic particles within the matrix is such that the distances between superparamagnetic particles are sufficient for the macroscopic core formed by this matrix and the superparamagnetic particles to have the same magnetic properties as the particles that form it.

Preferably, the superparamagnetic particles are uniformly distributed within the matrix, so as to have a uniform spatial distribution of the magnetic properties.

The superparamagnetic particles represent a percentage P of the total volume of the superparamagnetic core. Typically, the percentage P is chosen to be greater than 2.5%, preferably greater than 5% or even 15%. Furthermore, although this runs the risk of complicating the electronics used to determine the position of the moving part, the percentage P may be chosen to be for example strictly less than 5%, as this reduces the cost of the core 10.

There is a threshold L for the percentage P above which the core formed by this matrix and these superparamagnetic particles loses its superparamagnetic properties, since the distances between superparamagnetic particles are too short, so that the superparamagnetic particles are magnetically coupled to one another and then behave as a ferromagnetic particle, the largest dimension of which exceeds the threshold above which the superparamagnetic properties disappear.

The percentage P is also chosen to be as close as possible to this limit L, without exceeding it. For example, the percentage P is chosen within the range defined by the following relationship:

$$L-10\% \leq P \leq L-1\%.$$

The higher the percentage P, the greater the capability of the core 10 to concentrate the flux to be measured, thereby improving the performance of the sensor 6.

The relative permeability $\mu_r$ of the core 10 is preferably strictly greater than 1 so as to concentrate the magnetic flux. Here, the maximum value $\mu_{max}$ of the relative permeability of the core 10 is obtained for a zero value of the induced magnetic field in the core 10. For example, $\mu_{max}$ is greater than 1.5.

The circuit 12 is capable of exciting the core 10 by means of an excitation magnetic field $H_{ex}$ and of measuring the induced magnetic field $H_i$ in the core 10 in response to this excitation.

The field $H_{ex}$ is an AC magnetic field, the frequency $F_0$ of which is at least twice that of the magnetic field to be measured. Typically, the frequency of the magnetic field $H_{ex}$ is greater than 100 Hz and preferably greater than 1000 Hz.

The circuit 12 includes an adjustable source for creating the field $H_{ex}$. This source is for example formed from an excitation coil 20 supplied with AC current of frequency $F_0$ by a controllable power supply 22.

The coil 20 is wound around the core 10 so that the field $H_{ex}$ is vertical.

The circuit 12 also includes at least one transducer suitable for converting the induced magnetic field $H_i$ inside the core 10 to an electrical measurement signal, such as a measurable current or voltage. For this purpose, the or each of these transducers has a surface sensitive to the field $H_i$.

The circuit 12 here comprises two transducers 26 and 28 sensitive to the fields $H_i$ within the core.

For example, the transducers 26 and 28 are measurement coils wound around the core 10 in opposite directions to each other. These transducers 26 and 28 are each placed at a respective end of the core 10. The coil 20 is placed at mid-distance between the transducers 26 and 28.

The transducers 26 and 28 are differentially connected to the input of a passive filter 30. Thus, in the absence of a magnetic field to be measured, the electrical signal at the input of the filter 30 is zero. Such a differential arrangement of the transducers 26 and 28 enables the sensitivity of the sensor 6 to be increased.

The length of the core 10 in the Y direction is denoted by $L_n$. The length of the transducer 26 or 28 in the Y direction is denoted by $L_b$. In general, in the device 2, the lengths $L_a$, $L_n$ and $L_b$ must satisfy the following relationship:

$$L_b < L_a < 10 L_n.$$

Here, $L_a$ is less than $L_n$.

The filter 30 is used for prefiltering, so as to remove the harmonics of no interest for the rest of the processing from the electrical measurement signal.

The output of the filter 30 is connected to the input of an amplitude demodulator 32 suitable for extracting the amplitude of one or more harmonics of the measurement signal. Here, the demodulator 32 extracts the amplitudes of the harmonics having frequencies that are integer multiples of $F_0$, where $F_0$ is the frequency of the excitation field. Preferably, if the amplitude of a single harmonic is measured, the frequency of this harmonic is $NF_0$, where N is an even number so as to make the signal processing easier. For example, here N is equal to 2.

The demodulator 32 is, for example, a synchronous demodulator connected to the power supply 22 so as to be phase-synchronized with said supply.

The circuit 12 also includes a field feedback for making the sensor 6 more robust with respect to temperature variations and to increase its linearity range.

The field feedback is also used here to keep the amplitude of the field $H_i$ permanently within the operating range [$H_{min}$; $H_{max}$] located around zero, and preferably centered around the zero value. The operating range [$H_{min}$; $H_{max}$] is shown in FIGS. 2 to 4.

For this purpose, the circuit 12 is equipped with a regulator 36, one input of which is connected to an output of the demodulator 32 and the outputs of which are connected to a field feedback coil 40. The regulator 36 is capable of controlling the coil 40 in such a way that the latter creates a feedback magnetic field $H_c$ suitable for nullifying the magnetic field $H_m$ to be measured.

For this purpose, the coil 40 is wound around the core 10. The coil 40 is located here at mid-distance between the transducers 26 and 28.

The current flowing in the coil 40 is representative of the amplitude of the magnetic field to be measured.

One of the outputs of the regulator 36 is connected to a computer 44 suitable for calculating the distance d from the amplitude A of the magnetic field $H_m$.

For this purpose, the computer 44 is connected to a memory 46 containing a table 48 of standard values. The table 48 contains, for example, the values of the amplitude A of the magnetic field $H_m$ that are measured for known positions of the moving part 4.

Figure 5:
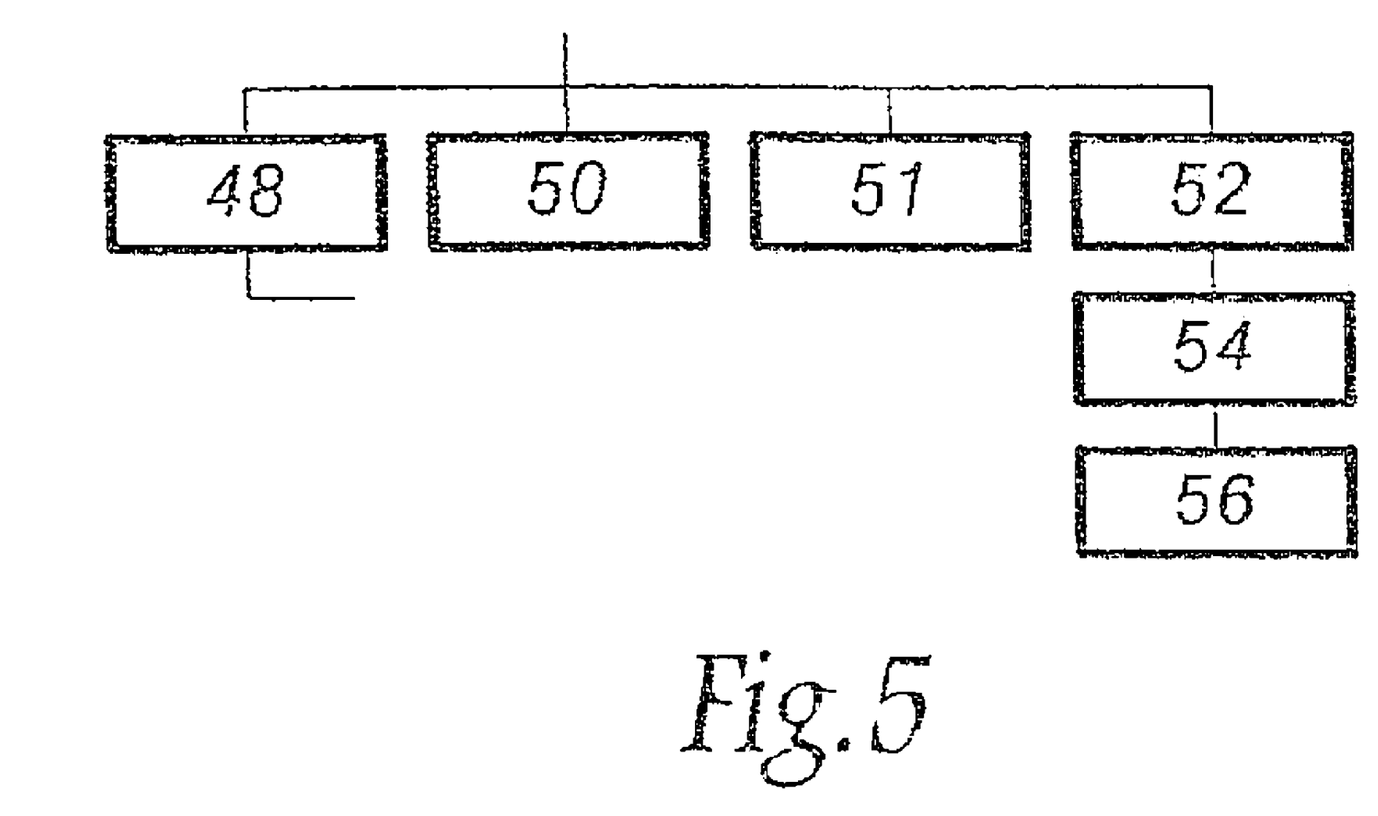
FIG. 5 is a block diagram of a method of measuring the position of a moving part using the device of FIG. 1.

The operation of the device 2 will now be described in conjunction with the method shown in FIG. 5.

During step 48, the generator 8 generates the magnetic field $H_m$ to be measured. The field lines of the magnetic field $H_m$ are concentrated within the core 10. The amplitude of the field $H_m$ in the core 10 depends on the distance separating the generator 8 from the core 10 and is therefore a function of the distance d.

In parallel, during step 50, the coil 20 creates the field $H_{ex}$ inside the core 10. Also in parallel, during step 51, the coil 40 creates the magnetic field $H_c$.

The magnetic field $H_i$ which is induced inside the core 10 and to which the transducers 26 and 28 are sensitive is therefore the result of the vector sum of the fields $H_m$, $H_{ex}$ and $H_c$.

During steps 50 and 51, the circuit 12 generates the fields $H_{ex}$ and $H_c$ so that the amplitude of the induced magnetic field $H_i$ is kept within the [$H_{min}$; $H_{max}$] range.

The induced magnetic field is converted in step 52 to a current by the transducers 26 and 28.

All the following steps for processing the current produced by the transducers 26 and 28, so as to obtain a magnetic field amplitude $H_m$, are collected in step 54.

The filter 30 filters the difference between the currents generated by the transducers 26 and 28 so as to obtain a filtered signal. The demodulator 32 extracts the amplitude of the harmonic of frequency $NF_0$ from the filtered signal. The appearance of this harmonic of frequency $NF_0$ is linked to the nonlinearity of the B(H) magnetic cycle of the core 10 and therefore to the nonlinear variations of the relative permeability of the core 10. More precisely, the deformations of the field $H_{ex}$ due to these nonlinearities vary with the amplitude of the field $H_m$. These deformations of the field $H_{ex}$ result from the presence of harmonics at multiples of $F_0$ in the induced magnetic field $H_i$ measured by the transducers 26 and 28.

This amplitude is used by the regulator 36 to control the coil 40 so as to generate the field $H_c$ of opposite direction and opposite amplitude to the field $H_m$.

The feedback signal generated by the regulator 36 is therefore representative of the amplitude A of the field $H_m$.

During step 56, the computer 44 establishes the actual distance d from the amplitude A of the field $H_m$. For this purpose, during step 56, the computer uses the reference values recorded in the table 48.

Figure 6:
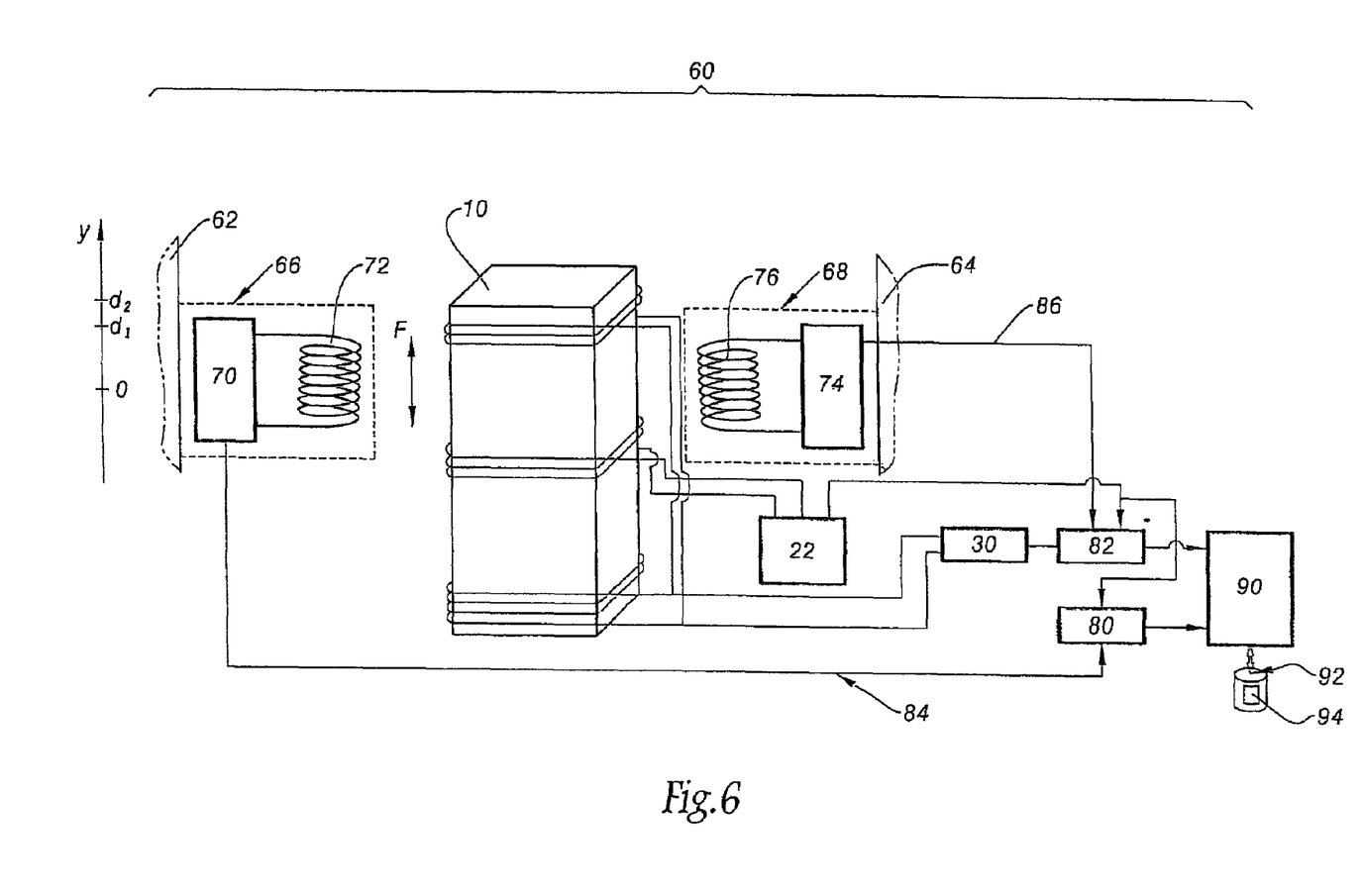
FIG. 6 is a schematic illustration of the architecture of a device for simultaneously measuring the position of two moving parts.

FIG. 6 shows a device 60 for measuring the simultaneous position of two moving parts 62 and 64 along a vertical axis Y. The positions of the parts 62 and 64 are identified by distances $d_1$ and $d_2$ respectively relative to an origin O on the Y axis.

Generators 66 and 68 are fixed without any degree of freedom to the parts 62 and 64 respectively. The generators 66 and 68 generate fields to be measured, $H_{m1}$ and $H_{m2}$ respectively, parallel to the Y axis.

The generator 66 here is formed from an AC current source 70 supplying a coil 72 so as to generate the magnetic field $H_{m1}$ at the frequency $f_1$.

Similarly, the generator 68 is formed from an AC current source 74 connected to a coil 76 which generates the magnetic field $H_{m2}$ to be measured at the frequency $f_2$.

The power spectrum of the magnetic field $H_{m2}$ differs from the power spectrum of the field $H_{m1}$ at least by the position of a power peak. For example, here the power spectrum of the fields $H_{m1}$ and $H_{m2}$ each have a single power peak at frequencies $f_1$ and $f_2$ respectively, which are different.

The device 60 also includes a magnetic field sensor for detecting the magnetic field to be measured, this being similar to the sensor 6 except for the fact that the synchronous demodulator 32 is replaced by two synchronous demodulators 80 and 82. To simplify FIG. 6, the components for producing a field feedback have not been shown.

The synchronous demodulator 80 is connected by a link 84 to the generator 66 so as to be phase-synchronized with this generator. The demodulator 80 is configured so as to extract the amplitude of the harmonic of frequency $n_1F_0+m_1f_1$ from the measurement signal delivered by the filter 30, where $n_1$ and $m_1$ are non zero integers. Preferably, $n_1$ is equal to 2 and $m_1$ is equal to ±1.

Similarly, the demodulator 82 is connected via a link 86 to the generator 68 so as to be phase-synchronized with this generator. The generator 82 is configured to extract the amplitude of the harmonic of frequency $n_2F_0+m_2f_2$ from the measurement signal, where $n_2$ and $m_2$ are non zero integers. Preferably, $n_2$ is equal to 2 and $m_2$ is equal to ±1.

The amplitudes $A_1$ and $A_2$ extracted by the demodulators 80 and 82 are uniquely proportional to the distances $d_1$ and $d_2$ respectively. The amplitudes $A_1$ and $A_2$ are sent to a computer 90 connected to a memory 92 containing a table 94 of reference values. The table 94 contains values of the amplitudes extracted by the demodulators 80 and 82 for known distances $d_1$ and $d_2$.

The computer 90 is capable of establishing the distances $d_1$ and $d_2$ from the values contained in the table 94.

Preferably, the frequency $F_0$ of the magnetic field $H_{ex}$ is more than ten times higher than the frequency $f_1$ or $f_2$.

The operation of the device 60 derives from the operation described in respect of the device 2. However, the device 60 is capable of simultaneously measuring the position of the parts 62 and 64 using a common core 10. This is because the harmonics of frequency $n_1F_0+m_1f_1$ are created only by the generator 66, whereas the harmonics of frequency $n_2F_0+m_2f_2$ are only created by the generator 68.

Figure 7:
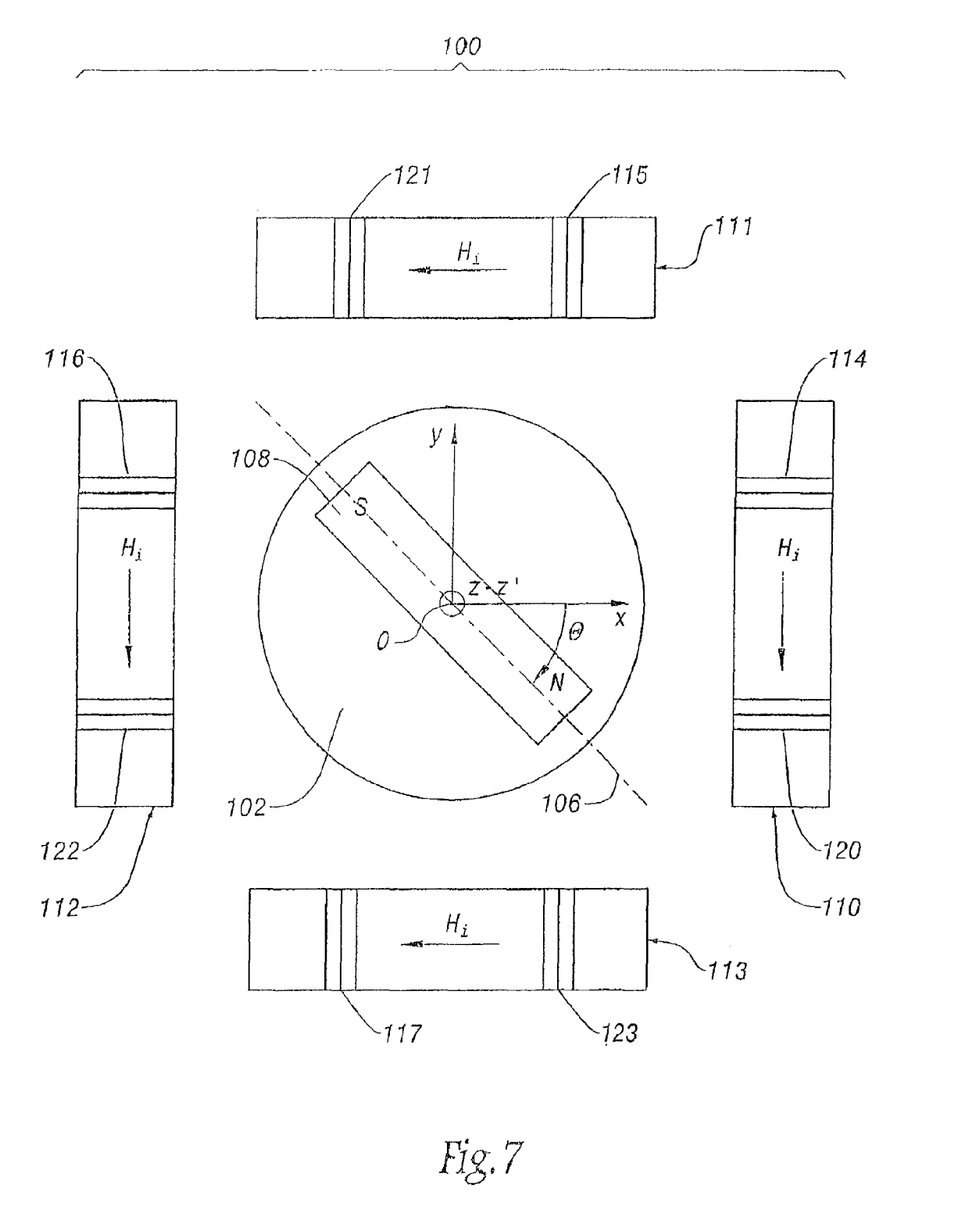
FIG. 7 is a schematic illustration of the architecture of a device for measuring the angular position of a rotationally mounted part.

FIG. 7 shows a device 100 for measuring the angular position θ of a moving part 102. The part 102 is mounted so as to rotate about an axis Z-Z' perpendicular to the plane of the sheet. The angle θ is defined between:
a horizontal direction X perpendicular to the Z-Z' axis and intersecting the Z-Z' axis at a point O; and
a fixed axis 106 of the part 102 perpendicular to the Z-Z' axis and passing through the point O.

The device 100 comprises a magnet 108 fixed with no degree of freedom to one end of the part 102. The Z-Z' axis passes through the center of this magnet 108 and the North and South poles of this magnet are located to the right and to the left of the Z-Z' axis respectively.

The device 100 also includes four cores 110 to 113 made of superparamagnetic material, these being based around the periphery of the part 102.

The cores 110 and 112 lie in the plane defined by the X axis and a Y axis perpendicular to the X and Z-Z' axes and passing through the point O. In this plane, the cores 110 and 112 are placed in diametrically opposed positions relative to the point O. Here, the cores 110 and 112 are placed on the X axis.

Similarly, the cores 111 and 113 lie in the plane defined by the X and Y axes and are placed so as to be diametrically opposed relative to the point O. Here, the cores 111 and 113 are placed on the Y axis.

Each of these cores has an excitation coil, 114 to 117 respectively, suitable for creating an AC excitation magnetic field $H_{ex}$ in each of these cores at the frequency $F_0$.

Each of these cores 110 to 113 also includes a transducer, 120 to 123 respectively, suitable for measuring the magnetic field $H_i$ induced in each of these cores.

The transducers 120 and 122 are connected differentially to the input of a filter and then of a first synchronous demodulator suitable for extracting the amplitude $A_1$ of the harmonic of frequency $NF_0$, where N is an integer greater than or equal to 2.

The transducers 121 and 123 are also connected differentially to the input of another filter and to a second synchronous demodulator suitable for extracting the amplitude $A_2$ of the harmonic of frequency $NF_0$. The amplitudes $A_1$ and $A_2$ are each proportional to the angle θ to within ±180°. Therefore, by combining the amplitudes $A_1$ and $A_2$ it is possible to obtain a measurement of the angle θ with an uncertainty strictly less than 180°.

The operation of the device 100 derives from that of the device 2.

Many other embodiments are possible. For example, in each of the embodiments in which the generator is a magnet, this may be replaced with a coil producing a constant DC field or with a coil producing a periodic field, the frequency spectrum of which is known.

Although the various embodiments have been described in the particular case in which two differentially connected transducers are used, it is possible to omit one of these two transducers and to work only with a single transducer, this being in particular the case if, for example, there is superposed on top of the magnet 8 of the device 2 an identical magnet, but placed head-to-tail with the latter, i.e. the polarities with respect to the magnet 8 and the added magnet are the same. This makes it possible to linearize the variations of the magnetic field to be measured as a function of the distance d in the vicinity of a zero magnetic field to be measured. Instead of magnets, it may also be possible to use two DC magnetic field generators placed in opposite directions with respect to each other.

A magnetically conductive material may be interposed between the core and the generator fixed to the moving part.

It is also possible to determine the position of the moving part from the amplitude of the fundamental of the measurement signal. To do this, a synchronous demodulator or a measurement of the variation of the inductance may be used. This corresponds to the case in which N is equal to 1 in the device 100.

The excitation magnetic field $H_{ex}$ is not necessarily a sinusoidal field. As a variant, this excitation field has any waveform. For example, the waveform is rectangular, triangular or of another shape.

Similarly, the waveform of the magnetic field to be measured is not necessarily sinusoidal or constant. For example, a known pseudorandom signal may be used. In the latter case, the synchronous demodulator is replaced with an amplitude demodulator suitable for extracting the amplitude of the magnetic field induced in the core in response to the field $H_m$ from the measurement signal. For this purpose, the demodulator uses for example the known pseudorandom signal.

What has been described with regard to FIG. 7, i.e. the use of transducers connected differentially but wound around separate cores, may be applied to the other embodiments described here.

The excitation and measurement coils may coincide. Likewise, the excitation coil and the field feedback coil may also be coincident.

The field feedback may be omitted.

The measurement of harmonics may be reduced to measuring a single harmonic, and in this case it will be preferable to choose an even harmonic, i.e. N=2.

The coils and the transducers may be embedded within the superparamagnetic core using any type of molding or overmolding process.

The superparamagnetic core may be replaced by any core made of a magnetic material (for example a composite of soft magnetic alloys) having curves similar to those shown in FIGS. 2 to 4.

The superparamagnetic core is used here at the same time as modulator of the excitation magnetic field as a function of the magnetic field to be measured and as magnetic flux concentrator. As a variant, the superparamagnetic core may be used in a magnetic field sensor only as modulator.

The device 60 has been described in the particular case in which the same core 10 is used for simultaneously measuring the position of two moving parts 62 and 64. The teaching given with regard to the device 60 may be generalized to the simultaneous measurement of the position of more than two moving parts. For this purpose, each moving part will be equipped with its own generator for generating the field to be measured. The various magnetic fields to be measured, generated by each of these generators, have power spectra that differ from one another at least by the position of a power peak.

The invention claimed is:

1. A device for measuring the position of at least a first moving part (4; 62; 64, 102), this device comprising:
    at least a first generator (8; 66; 108) for generating a first magnetic field to be measured, this first generator being fastened to the first moving part;
    at least one magnetic core providing means for capable of modulating the amplitude of an excitation magnetic field ($H_{ex}$) as a function of the amplitude of the first magnetic field to be measured, this magnetic core having a magnetic induction cycle as a function of the magnetic field with no hysteresis within an operating range [$H_{min}$; $H_{max}$]; and
    an electronic computer (44) providing means for determining the position of the first moving part relative to the magnetic core from the amplitude of a magnetic field induced in the magnetic core, this induced magnetic field resulting from the combination of the magnetic field to be measured and the excitation magnetic field,
    in which the magnetic cycle of the magnetic core (10; 110-113) is characterized in that the absolute value of the third derivative of the magnetic induction with respect to the magnetic field is a maximum for a zero magnetic field.

2. The device as claimed in claim 1, in which an electronic circuit (12) is providing means for generating the excitation magnetic field and/or a feedback magnetic field suitable for permanently keeping the amplitude of the induced magnetic field within the operating range [$H_{min}$; $H_{max}$] located around zero, the magnetic core never being saturated within the operating range.

3. The device as claimed in claim 1, in which the magnetic core (10; 110-113) is a superparamagnetic core.

4. The device as claimed in claim 3, in which the superparamagnetic core (10; 110-113) is formed from a solid matrix in which superparamagnetic particles are dispersed so as to be spaced apart from one another sufficiently for the core to be superparamagnetic.

5. The device as claimed in claim 4, in which the superparamagnetic particles represent at least 5% of the volume of the matrix into which they are incorporated.

6. The device as claimed in claim 1, in which the device comprises:
    a second generator (68) for generating a second magnetic field to be measured, this second generator being fastened to a second moving part (64), the second magnetic field having a power spectrum having at least one power peak at a different frequency from the frequencies for which the power spectrum of the first magnetic field has power peaks;
    the same magnetic core (10) is also providing means for simultaneously modulating the amplitude of the excitation magnetic field as a function of the amplitude of the first and second magnetic fields to be measured; and
    the electronic circuit providing means for:
    determining the position of the first moving part (62) relative to the core (10) from the amplitude of the magnetic field induced in the magnetic core and from the first field ($H_{m1}$) generated during the measurement interval (T) and
    determining the position of the second moving part (64) relative to the core (10) from the amplitude of the same magnetic field induced in the magnetic core and from the second field ($H_{m2}$) generated during the same measurement interval (T),
    the magnetic field induced in the magnetic core resulting from the combination of the first and second magnetic fields to be measured and the excitation magnetic field.

7. The device as claimed in claim 1, in which at least one of the power spectra of the excitation magnetic field or the power spectrum of the magnetic field to be measured has a dominant power peak for a frequency $F_0$ and in which an electronic circuit (12) providing means for measuring an amplitude of the magnetic field to be measured comprises:
    at least one transducer (26, 28) suitable for converting the magnetic field induced inside the core (10) to a measurement signal; and
    an amplitude demodulator (32; 80, 82) suitable for extracting the amplitude of a harmonic of the measurement signal at a frequency $NF_0$, N being an integer greater than or equal to two.

8. The device as claimed in claim 7, in which N is equal to two.

9. The device as claimed in claim 1, in which:
the first generator, fastened to the moving part, generates a DC magnetic field having a positive polarity and a negative polarity; and
the device includes a third generator, for generating a DC magnetic field to be measured, this third generator being fastened to the same moving part and having a positive polarity and a negative polarity, either the positive polarity or the negative polarity of the third generator being placed opposite the polarity of the same sign of the first generator.

10. A method of measuring the position of a first moving part (4), this method comprising:
the generation (48) of a first magnetic field to be measured by means of a field generator fastened to the first moving part (4);
the provision of at least one magnetic core (10) providing means for modulating the amplitude of an excitation magnetic field as a function of the amplitude of the first magnetic field to be measured, this magnetic core having a magnetic induction cycle as a function of the magnetic field with no hysteresis within an operating range [$H_{min}$; $H_{max}$] ; and
the determination (56) of the position of the first moving part (4) relative to the magnetic core from the amplitude of a magnetic field induced in the magnetic core (10), this induced magnetic field resulting from the combination of the first magnetic field to be measured and the excitation magnetic field,
in which the magnetic cycle of the magnetic core (10) is characterized in that the absolute value of the third derivative of the magnetic induction with respect to the magnetic field is a maximum for a zero magnetic field.

11. The device as claimed in claim 2, in which the magnetic core (10; 110-113) is a superparamagnetic core.

12. The device as claimed in claim 2, in which the device comprises:
a second generator (68) for generating a second magnetic field to be measured, this second generator being fastened to a second moving part (64), the second magnetic field having a power spectrum having at least one power peak at a different frequency from the frequencies for which the power spectrum of the first magnetic field has power peaks;
the same magnetic core (10) is also providing means for simultaneously modulating the amplitude of the excitation magnetic field as a function of the amplitude of the first and second magnetic fields to be measured; and
the electronic circuit is providing means for:
determining the position of the first moving part (62) relative to the core (10) from the amplitude of the magnetic field induced in the magnetic core and from the first field ($H_{m1}$) generated during the measurement interval (T) and
determining the position of the second moving part (64) relative to the core (10) from the amplitude of the same magnetic field induced in the magnetic core and from the second field ($H_{m2}$) generated during the same measurement interval (T),
the magnetic field induced in the magnetic core resulting from the combination of the first and second magnetic fields to be measured and the excitation magnetic field.

13. The device as claimed in claim 2, in which at least one of the power spectra of the excitation magnetic field or the power spectrum of the magnetic field to be measured has a dominant power peak for a frequency $F_0$ and in which an electronic circuit (12) providing means for measuring an amplitude of the magnetic field to be measured comprises:
at least one transducer (26, 28) suitable for converting the magnetic field induced inside the core (10) to a measurement signal; and
an amplitude demodulator (32; 80, 82) suitable for extracting the amplitude of a harmonic of the measurement signal at a frequency $NF_0$, N being an integer greater than or equal to two.

14. The device as claimed in claim 2, in which N is equal to two.

* * * * *